US005666834A

United States Patent [19]

Inoue

[11] Patent Number: 5,666,834

[45] Date of Patent: Sep. 16, 1997

[54] ANTI-THEFT MECHANISM FOR A VEHICLE DOOR LOCK DEVICE

[75] Inventor: Jiro Inoue, Yamanashi-ken, Japan

[73] Assignee: Mitsui Kinzoku Kogyo Kabushiki Kaisha, Tokyo, Japan

[21] Appl. No.: 358,559

[22] Filed: Dec. 14, 1994

[30] Foreign Application Priority Data

Dec. 24, 1993 [JP] Japan .................................... 5-348186

[51] Int. Cl.$^{6}$ .................................................... B60R 25/00

[52] U.S. Cl. ...................................... 70/237; 292/DIG. 27

[58] Field of Search .................... 292/DIG. 23, DIG. 26, 292/DIG. 27, 336.3; 70/237, 264, 277

[56] References Cited

U.S. PATENT DOCUMENTS

| | | | |
|---|---|---|---|
| 4,334,704 | 6/1982 | Yamada | 292/216 |
| 4,342,209 | 8/1982 | Kleefeldt | 70/264 |
| 4,440,006 | 4/1984 | Kleefeldt | 292/DIG. 23 |
| 4,487,441 | 12/1984 | Miyamoto | 292/336.3 |
| 4,492,395 | 1/1985 | Yamada | 292/DIG. 27 |
| 4,616,862 | 10/1986 | Ward | 292/DIG. 27 |
| 4,669,283 | 6/1987 | Ingenhoven | 70/264 |
| 4,974,886 | 12/1990 | Kleefeldt | 292/201 |
| 5,263,751 | 11/1993 | Priest | 292/DIG. 27 |

*Primary Examiner*—Steven N. Meyers
*Assistant Examiner*—Gary Estremsky
*Attorney, Agent, or Firm*—Browdy and Neimark

[57] ABSTRACT

An anti-theft mechanism for a vehicle door lock device comprises a latch mechanism having a latch engaging with a striker, an opening means for releasing the engagement of the latch and the striker, and a lock lever connected to a key cylinder of a door and changed between a locked position and an unlocked position, and a relay mechanism having a sill knob lever connected to a sill knob of the door, an anti-theft member arranged to be changed between an anti-theft cancelled position and an anti-theft position, and an actuator for anti-theft operation for changing the anti-theft member. The sill knob lever is arranged to be pushed by the anti-theft member to return to the locked position, if the anti-theft member switches from the anti-theft position to the cancelled position when the sill knob lever is in the unlocked position.

33 Claims, 5 Drawing Sheets

FIG. 1
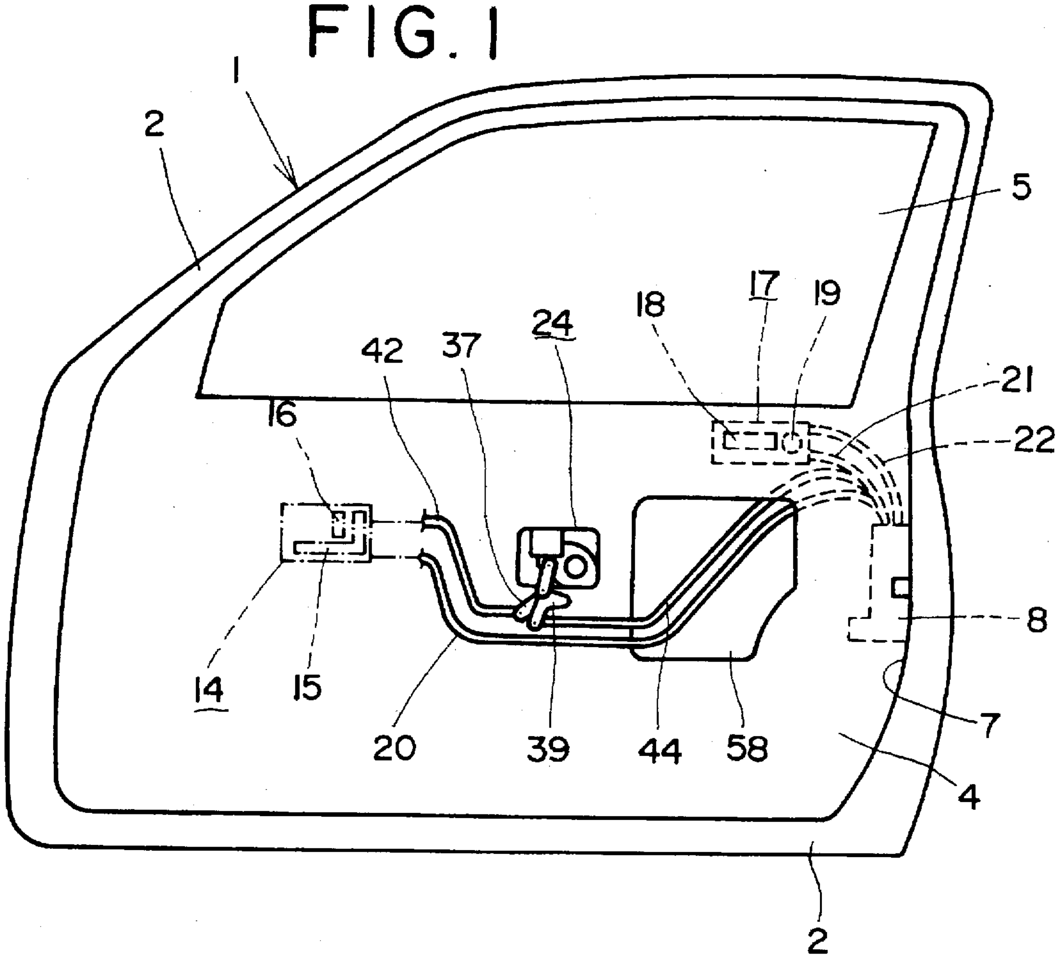
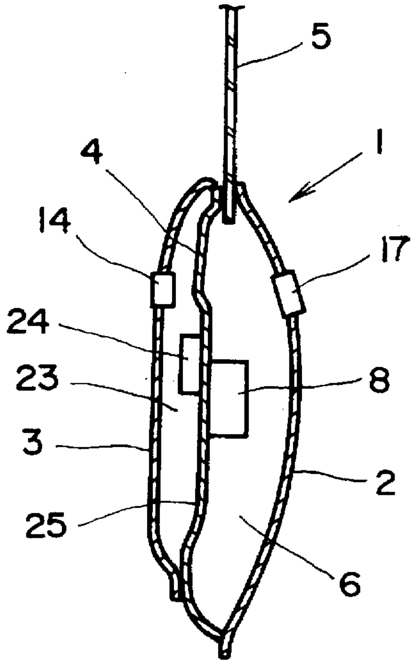
FIG. 2

FIG.6
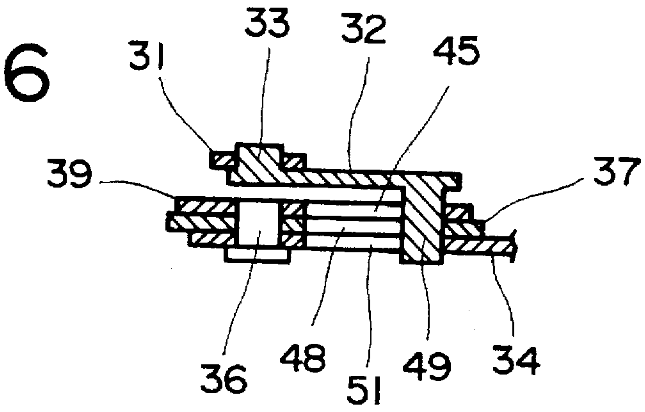
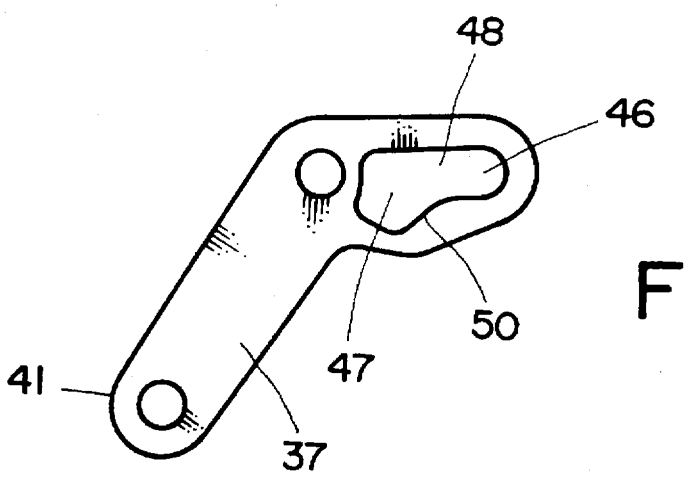
FIG.7
FIG.8
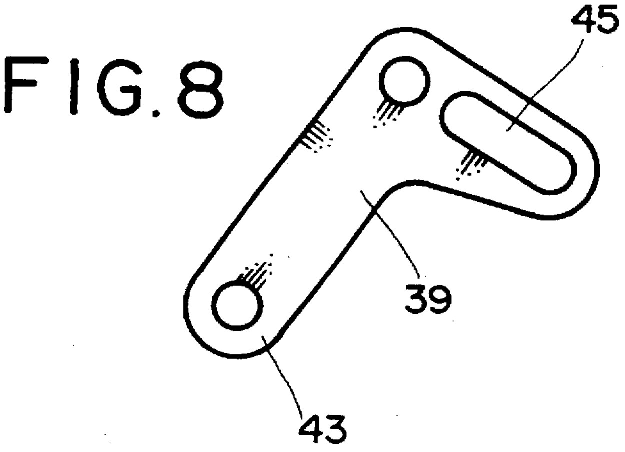

ANTI-THEFT MECHANISM FOR A VEHICLE DOOR LOCK DEVICE

FIELD OF THE INVENTION

The present invention relates to an anti-theft mechanism for use in a vehicle door lock device. Such an anti-theft mechanism is intended to maintain the locked position of the lock device when a sill knob (sometimes called the "locking knob") provided on the inside surface of a door is moved to an open position without authorization.

PRIOR ART

A conventional door lock device having an anti-theft mechanism is provided with a lock lever which is connected to a door key cylinder and is changed between a locked position and an unlocked position, a sill knob lever connected to a sill knob of the door, and an anti-theft member provided between the sill knob lever and the lock lever. The anti-theft member is arranged to be changed by a motor between an anti-theft cancelled position in which the sill knob lever and the lock lever are in a connecting condition and an anti-theft position in which the sill knob and the lock lever a disconnected condition. All of the lock devices mounted to doors of the vehicle are connected to a central control unit. When a mode of the lock device at a driver's door is switched, the modes of the lock devices of the remaining doors are changed through their linkage together.

In the case of the conventional device, when the anti-theft member is moved by a motor to the cancelled position, the lock lever also moves to the unlocked position. Namely, the release of the anti-theft condition and the release of the locked condition are performed together. Thus, the anti-theft condition can not be released without releasing the locked condition.

In order to make independent release of the locked condition and the release of the anti-theft condition motors are respectively provided for moving the anti-theft member and moving the lock lever separately. Controlling independently the release of the locked position and the anti-theft position at the driver's door permits releasing only the anti-theft condition while the locked condition is maintained in the lock devices of the remaining doors. Such use is effective, especially in an unsafe place. When a driver gets in a car from the driver's door, the other doors remain in the locked condition. Thus, ruffians can be prevented from forcing their way into the car using the remaining doors.

However, making the release of the locked condition and the anti-theft condition achievable independently as described above, a problem. Under the anti-theft condition, the locked condition of the device cannot be released even if car thieves unlock a sill knob by using the special tool. However, when such an unauthorized operation is performed while the lock lever is in the locked position, the sill knob is moved to the unlocked position and the positions of the sill knob and the anti-theft member become inconsistent. If such inconsistency exists after the anti-theft condition is released, undesirable confusion may occur.

SUMMARY OF THE INVENTION

Accordingly, an object of the present invention is to provide an anti-theft mechanism which can overcome the drawback described above.

In order to achieve the foregoing object, in the anti-theft mechanism of the present invention, the sill knob (sill knob lever) is made so that it returns to the locked position by being pushed by the anti-theft member when the anti-theft member moves to the cancelled position from the anti-theft position.

Further, another object of the present invention is to provide an anti-theft mechanism which can be easily mounted on an ordinary lock device provided with no anti-theft mechanism.

Other features and advantages of the invention will be apparent from the detailed description of the preferred embodiments found below with reference to the accompanying drawings described hereafter.

BRIEF DESCRIPTION OF THE DRAWINGS

FIG. 1 is a side elevation of a door in a state of removing a dressing panel;

FIG. 2 is a sectional view of the door;

FIG. 6 is a sectional view showing an engaged state of a sill knob lever, a sub locking lever and an anti-theft member;

FIG. 7 is a plan view of the sill knob lever;

FIG. 8 is a plan view of the sub locking lever;

DESCRIPTION OF THE PREFERRED EMBODIMENT

Figure 3:
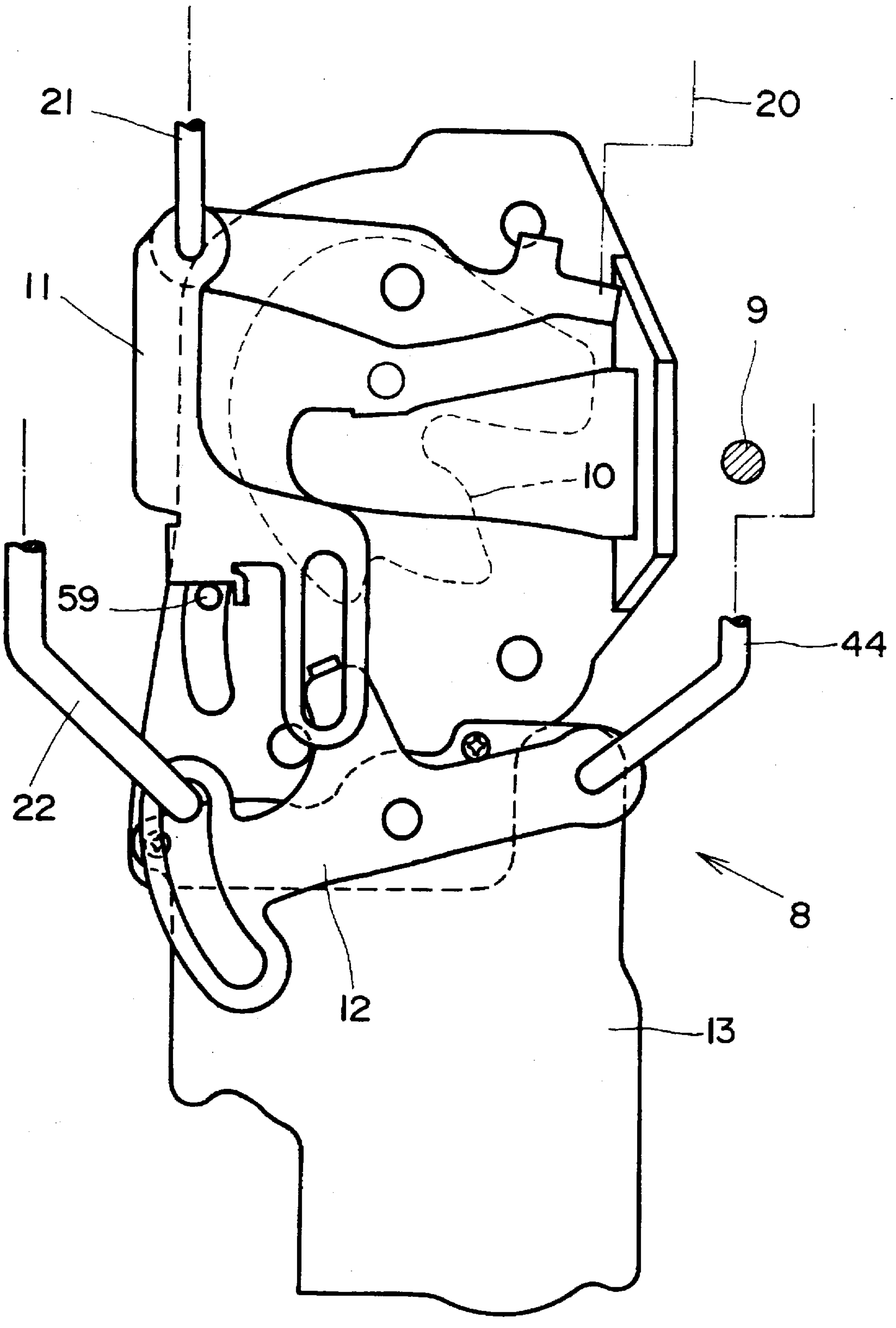
FIG. 3 is a front elevation of a latch mechanism.

Hereinafter, an embodiment of the present invention will be described by referring to the drawings.

FIG. 1 shows a lock device mounted on a door 1 of a vehicle. As is well known, the door 1 has a metallic outer panel 2, a metallic inner panel 4, a dressing panel 3 installed by clips to the interior side of the inner panel 4, and a window glass 5. An inner operating unit 14 having an inner door opening handle 15 and a sill knob (or a locking knob) 16 is mounted to the dressing panel 3, and an outer operating unit 17 having an outer door opening handle 18 and a key cylinder 19 is mounted to the outer panel 2. A service hole 58 to be used for connecting the members of the lock device is formed in the inner panel 4. Incidentally, in FIG. 1, the door 1 in which the dressing panel 3 is removed is shown.

A latch mechanism 8 of the lock device is fixed within a housing or space 6 between the outer panel 2 and the inner panel 4 with bolts or the like so that it comes into contact with the surface of the back end portion 7 of the inner panel 4. As shown in FIG. 3, the latch mechanism 8 has a latch 10 engaging with a striker 9 fixed to a vehicle body, a ratchet (not shown) for maintaining the engagement of the striker 9 and the latch 10, an open link 11 engaging with a pin 59 of the ratchet to release the ratchet from the latch 10, a lock lever 12 for changing the open link 11 between a locked position and an unlocked position, and an actuator 13 for turning the lock lever 12. The structure of the latch mechanism 8 of the present application is not peculiar one but is well known.

The open link 11 is connected to the inner door opening handle 15 and the outer door opening handle 18 through connecting members 20 and 21 such as rods or wires, respectively. The lock lever 12 is connected to the key cylinder 19 through a connecting member 22. The lock lever 12 is also connected to the sill knob 16 through a connecting member 44, a relay mechanism 24 and another connecting member 42.

The relay mechanism 24 is a special one according to the present invention and is mounted within a housing or space portion 23 between the inner panel 4 and the dressing panel 3. The space portion 23 is always provided to well known doors conventionally without exception. However, in case where the size of the chamber portion 23 is too small to install the relay mechanism 24, sometimes there is a case where a recess 25 is formed in the inner panel 4.

The relay mechanism 24 is provided between the lock lever 12 and the sill knob 16 and will be described in detail hereinbelow by referring to FIGS. 4 to 11. The relay mechanism 24 has an anti-theft mechanism which makes the lock condition of the latch mechanism 8 unable to release by unlocking operation of the sill knob 6. An actuator 29, for operating the anti-theft mechanism, which has a motor 27 and a reduction mechanism 28 is mounted to a base 26 fixed to the inner panel 4 with bolts. An output member 31 is secured to an output shaft 30 of the actuator 29. An anti-theft member 32 has a pin portion 49 at an end thereof and a shaft portion 33 engaging with the output member 31 at the other end thereof.

Figure 5:
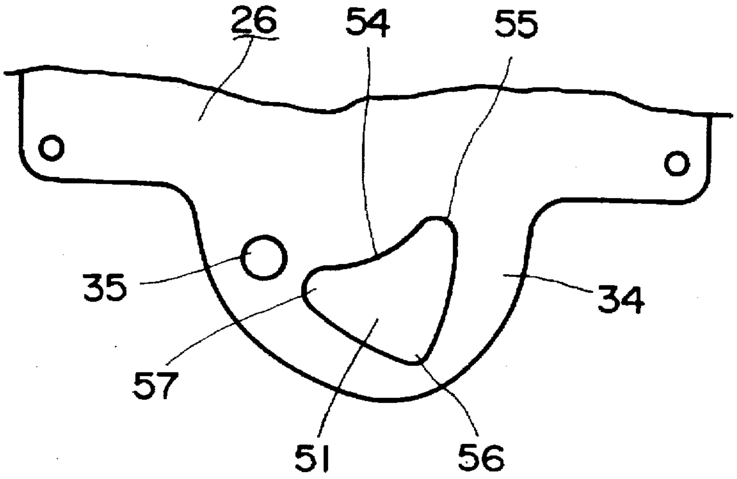
FIG. 5 is a partially enlarged view of a base of the relay mechanism.

As shown in FIG. 5, the base 26 has a bracket 34 which protrudes downward integrally. The bracket 34 has a shaft 36 (see FIG. 6) which is fitted into a hole 35 of the bracket 34. A sill knob lever 37 and a sub locking lever 39 are rotatably supported by the shaft 36. Both of the levers 37 and 39 are formed almost L shape. The connecting member 42 leading to the sill knob 16 is engaged with one end 41 of the sill knob lever 37, and the connecting member 44 leading to the lock lever 12 is engaged with one end 43 of the sub locking lever 39.

The pin portion 49 of the anti-theft member 32 is inserted into both of an engaging hole 48 of the sill knob lever 37 and an elongated hole 45 of the sub locking lever 39, as shown in FIG. 6. The elongated hole 45 of the sub locking lever 39 extends radially from the shaft 36. The engaging hole 48 of the sill knob lever 37 is constituted of an elongated hole 46 of which position and size are the same as of the elongated hole 45, and a relief hole 47 extending in the circumferential direction of the shaft 36 from the end portion of said elongated hole 46 at the side of the shaft 36.

Figure 4:
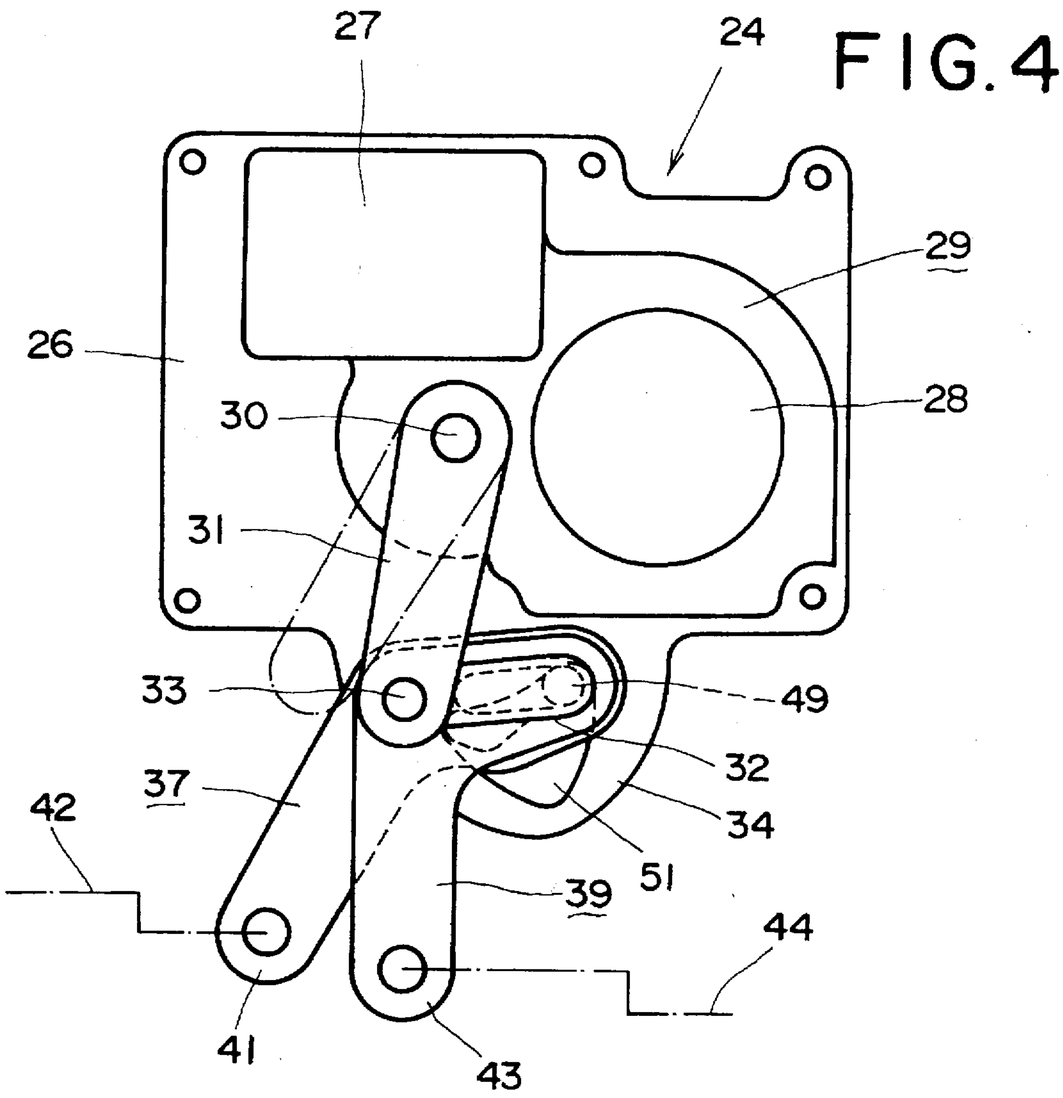
FIG. 4 is a front elevation of a relay mechanism.

As illustrated in FIG. 4, the output member 31 swings between a first position or an anti-theft cancelled position indicated by a solid line and a second position or an anti-theft position indicated by a virtual curve by the motor 27. When the output member 31 is in the first position, the pin portion 49 of the anti-theft member 32 engages with the tip sides of both the elongated holes 45 and 46, and that makes the sill knob lever 37 and the sub locking lever 39 in engaged state with each other. Therefore, in this condition, the sill knob lever 16 and the lock lever 12 are connected through the relay mechanism 24. Incidentally, when the output member 31 is in the first position indicated by the solid curve, the shaft center of the shaft portion 33 is coincident with that of the shaft 36.

Figure 9:
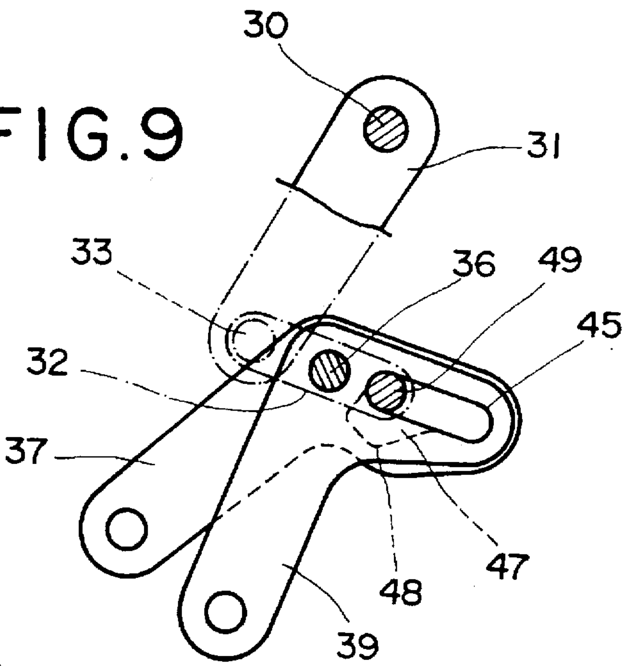
FIG. 9 is a relational diagram at the time when the sill knob lever and the sub locking lever are in a locked position, and the anti-theft member is in a anti-theft position.
Figure 10:
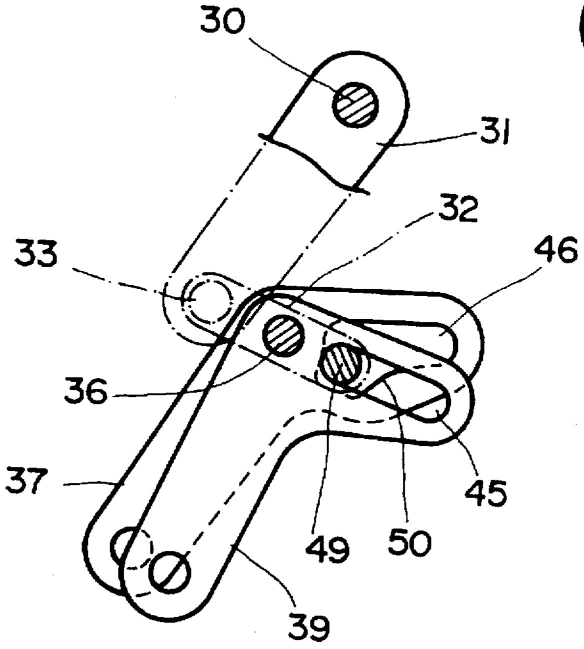
FIG. 10 is a relational diagram at the time when the sill knob lever has rotated to an unlocked position from the state in FIG. 9.

When the output member 31 comes to the anti-theft position indicated by the virtual curve, the pin portion 49 of the anti-theft member 32 moves toward the shaft 36 and comes to a position facing the escape hole 47 of the sill knob lever 37, as shown in FIG. 9. In this anti-theft condition, the sill knob lever 37 can not move the pin portion 49 even if the sill knob lever 37 is turned counterclockwise by means of the unlocking operation of the sill knob 16, as illustrated in FIG. 10. Thus, the sub locking lever 39 does not turn. Therefore, even if car thieves manipulate the sill knob 16 by using a special tool, they can not unlock the latch mechanism 8.

In order to release the anti-theft condition of the device of FIG. 9 if the output member 31 is turned by the actuator 29 to shift the anti-theft member 32 to the right side, only the anti-theft condition can release without moving the lock lever 12 or the sub locking lever 39.

As described above, FIG. 10 shows the state at the time when the sill knob 16 has been unlocked at the anti-theft condition. In this state, although the lock lever 12 and the sub locking lever 39 are in the locked position, the sill knob 16 and the sill knob lever 37 are in the unlocked position. Thus, the position of the lock lever 12 is inconsistent with the position of the sill knob 16. Even if only the anti-theft condition is released while maintaining the locked condition, the inconsistency between the position of the lock lever 12 and that of the sill knob 16 is still maintained, undesirable confusion.

Therefore, in the case of the present invention, the sill knob 16 returns to the locked position when the anti-theft member 32 moves to the cancelled position. As shown in FIG. 7 completely, an inclined guide surface or returning surface 50 is formed at the boundary between the elongated hole 46 and the escape hole 47 of the sill knob lever 37. In the state as illustrated in FIG. 10, the inclined guide surface 50 faces to the pin portion 49 of the anti-theft member 32, and when the pin portion 49 moves to the right side, the pin portion 49 comes into slidable contact with the guide surface 50 and the sill knob lever 37 turns clockwise. Thus, when the anti-theft member 32 moves to the cancelled position, the sill knob lever 37 and the sill knob 16 come to return to the locked position.

Figure 11:
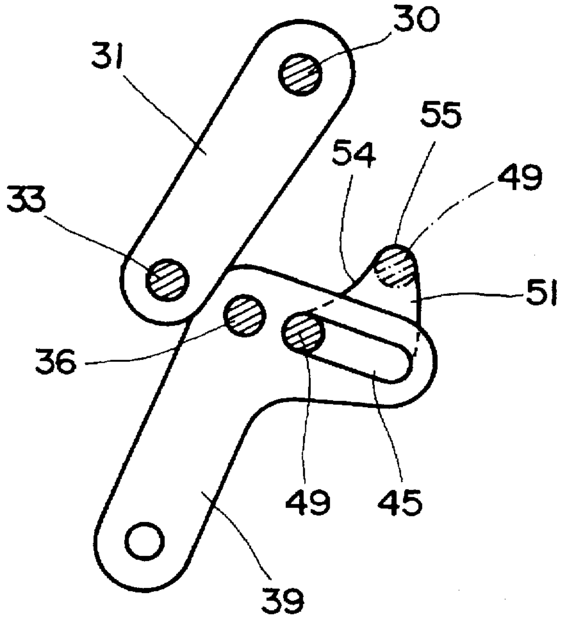
FIG. 11 is an explanation view for explaining an operation of releasing an anti-theft condition by a key cylinder.

Referring to FIG. 5 again, a substantially triangular aperture 51 is formed in the bracket 34 with which the pin portion 49 of the anti-theft member 32 is engaged. The pin portion 49 is located in the first corner 55 at the upper right of the aperture 51 at the time of unlocked condition, and it is located in the second corner 56 at the lower right of the aperture 51 at the time of locked condition. Further, the pin portion 49 is located in the third corner 57 at the left side of the aperture 51 at the time of anti-theft condition. A canceling cam face 54 for releasing the anti-theft condition by the operation of the key cylinder is formed between the first corner 55 and the third corner 57. FIG. 11 illustrates the relation between the aperture 51 and the pin portion 49 in the anti-theft condition. When unlocking the key cylinder 19, the sub locking lever 39 turns counterclockwise to push the pin portion 49 against the canceling cam face 54, in the state of FIG. 11. Then, the pin portion 49 gradually moves to the right side by the action of the canceling cam face 54 and reaches to the first corner 55, thereby the anti-theft condition is released. Thus, in the present invention, the anti-theft condition can also be released by the unlocking operation of the key cylinder 19. Therefore, even if the actuator 29 gets out of order or a battery runs down, the minimum functions of the lock device can be ensured.

In the foregoing embodiment of the present invention, the relay mechanism 24 is independent of the latch mechanism 8. Therefore, the relay mechanism 24 can be mounted within the highly safe space portion 6 between the dressing panel 3 and the inner panel 4. The relay mechanism 24, however, may be formed integrally with the latch mechanism 8. In this case, the pin portion 49 of the anti-theft member 32 can be engaged with the lock lever 12. Consequently, the sub locking lever 39 becomes unnecessary.

Hereinafter, an operation of this embodiment of the present invention will be described.

After closing the door 1, when, the key cylinder 19 or the actuator 13 is turned to lock the door, the lock lever 12 turns clockwise from the position of FIG. 3 and is switched to the locked position. Thereby, the open link 11 separates from the pin 59 of the ratchet (not shown), so that the lock device comes into a locked condition. Further, when the lock lever 12 turns, besides the sub locking lever 39 turns clockwise in the state of FIG. 4, the sill knob lever 37 turns clockwise, because the pin portion 49 is engaged with the elongated holes 45 and 46. As a result, the sill knob 16 is shifted to the locked position.

In this locked condition, because the sill knob lever 37 and sub locking lever 39 are connected with the pin portion 49 of the anti-theft member 32, the lock lever 12 can be switched to the unlocked condition when operating the sill knob 16.

When intending to change it to the anti-theft condition, the output member 31 is turned clockwise by the actuator 29 of the relay mechanism 24 to have the anti-theft member 32 move leftward. This state is illustrated in FIG. 9. When reaching this state, the pin portion 49 comes to a position facing the escape hole 47 of the engaging hole 48 of the sill knob lever 37. Thus, even if the sill knob lever 37 is turned counterclockwise by unlocking the sill knob 16, the pin portion 49 can not be moved as illustrated in FIG. 10. Thus, the sub locking lever 39 can not be turned, so that the locked condition can not be released.

When intending to release only the anti-theft condition, the output member 31 is turned counterclockwise by the actuator 29. Then, the anti-theft member 32 moves to the right and the pin portion 49 is engaged with the both tip sides of the elongated hole 45 of the sub locking lever 39 and the elongated hole 46 of the sill knob lever 37. Thereby, the sub locking lever 39 and the sill knob lever 37 return to a connected state again and the anti-theft condition is released.

In the anti-theft condition, if car thieves unlock the sill knob 16 using a special tool, the sill knob lever 37 turns to the unlocked position and becomes to the state as illustrated in FIG. 10. The sill knob lever 37 being in the unlocked position is automatically returned to the locked position when the anti-theft condition is released. Namely, if the anti-theft member 32 moves rightward by turning the output member 31 counterclockwise by means of the actuator 29, the pin portion 49 comes into contact with the inclined guide surface 50 formed at the boundary portion between the elongated hole 46 and the escape hole 47 of the sill knob lever 37. Thus the sill knob lever 37 is turned clockwise and returns to the locked position.

Although the preferred embodiment of the present invention has been described above, it should be understood that the present invention is not limited thereto and that other modifications will be apparent to those skilled in the art without departing from the spirit of the invention.

The scope of the present invention, therefore, is to be determined solely by the appended claims.

What is claimed is:

1. A relay mechanism engaged to a latch mechanism on a vehicle door of a vehicle body, comprising:

a latch mechanism having a latch engaging with a striker of the vehicle body, an opening means for releasing the engagement of the latch and the striker, and a lock lever connected to a key cylinder of the vehicle door and changed between a locked position precluding operation of the opening means and an unlocked position permitting operation of the opening means; and a relay mechanism having a sill knob lever connected to a sill knob of the vehicle door and changeable between a locked position and an unlocked position, an anti-theft member provided between the lock lever and the sill knob lever and arranged to be changeable between an anti-theft cancelled position in which the anti-theft member interconnects the lock lever and the sill knob lever and an anti-theft position in which the anti-theft member disconnects the lock lever and the sill knob lever, wherein an unlock operation of the sill knob lever is not transmitted to the lock lever, an actuator for anti-theft operation for changing the anti-theft member between the anti-theft position and the anti-theft cancelled position;

said sill knob lever having a guide surface which is engageable by the anti-theft member and moves the sill knob lever to return to the locked position from the unlocked position by abutting and slidably engaging the anti-theft member when the anti-theft member is displaced from the anti-theft position to the anti-theft cancelled position.

2. The relay mechanism engaged to the latch mechanism according to claim 1, wherein said anti-theft member is engaged with the lock lever when at the anti-theft position, wherein said relay mechanism has a cancelling cam face which is engageable by the anti-theft member and moves the anti-theft member to return to the anti-theft cancelled position by coming into abutting and slidable contact with the anti-theft member when the lock lever is turned by an unlocking operation of the key cylinder under the anti-theft position.

3. The relay mechanism engaged to the latch mechanism on a vehicle door of a vehicle body according to claim 1, wherein said lock lever has a main locking lever connected to the key cylinder and a sub locking lever connected to the main locking lever through a rod or a wire, said sub locking lever being provided on the relay mechanism and being slidably engaged with the anti-theft member, said relay mechanism being mounted to the vehicle door independently spaced apart from the latch mechanism in a different housing.

4. A relay mechanism engaged to a latch mechanism on a vehicle door of a vehicle body according to claim 3, wherein said relay mechanism is mounted in a space between a metallic inner panel of the vehicle door and a dressing panel which is installed to the inner panel.

5. The relay mechanism engaged to the latch mechanism on a vehicle door of a vehicle body according to claim 3, wherein said relay mechanism is mounted at about a middle portion between a front and a rear of the vehicle door.

6. The relay mechanism engaged to the latch mechanism on a vehicle door of a vehicle body according to claim 3, wherein said relay mechanism is mounted in a space between a metallic inner panel of the vehicle door and a dressing panel which is installed to the inner panel so that the relay mechanism is located at about a middle portion between a front and a rear of the vehicle door.

7. The relay mechanism engaged to the latch mechanism on a vehicle door of a vehicle body according to claim 1, wherein said sublocking lever and said sill knob lever are rotatably supported by the same shaft.

8. The relay mechanism engaged to the latch mechanism on a vehicle door of a vehicle body according to claim 7, wherein said sublocking lever has a first elongated hole extending radially from said shaft, wherein said sill knob lever has an engaging hole consisting of a second elongated hole corresponding to the first elongated hole and an escape hole communicating with the second elongated hole, wherein said anti-theft member has a pin portion slidably engaged with both of the first elongated hole and the engaging hole.

9. The relay mechanism engaged to the latch mechanism on a vehicle door of a vehicle body according to claim 8, wherein said guide surface with which the pin portion comes into contact with is formed in the engaging hole.

10. The relay mechanism engaged to the latch mechanism on a vehicle door of a vehicle body according to claim 8, wherein said relay mechanism has an aperture which is formed in a stationary member thereof, said aperture having a cancelling cam face which causes the anti-theft member to return to the anti-theft cancelled position by coming into contact with the pin portion when the lock lever is turned by an unlocking operation of the key cylinder under the anti-theft position.

11. The relay mechanism engaged to the latch mechanism on a vehicle door of a vehicle body according to claim 1, wherein a longitudinal plane of said sill knob lever is parallel to a longitudinal plane of the anti-theft member.

12. A relay mechanism engaged to a latch mechanism on a vehicle door of a vehicle body, comprising:

a latch mechanism having a latch engaging with a striker of the vehicle body, an opening means for releasing the engagement of the latch and the striker, and a lock lever connected to a key cylinder of the vehicle door and changed between a locked position precluding operation of the opening means and an unlocked position permitting operation of the opening means; and a relay mechanism having a sill knob lever connected to a sill knob of the door and changeable between a locked position and an unlocked position, a sub locking lever connected to the lock lever through a wire or a rod, an anti-theft member provided between the sub locking lever and the sill knob lever and arranged to be changeable between an anti-theft cancelled position in which the anti-theft member interconnects the sub locking lever and the sill knob lever and an anti-theft position in which the anti-theft member disconnects the sub locking lever and the sill knob lever, wherein an unlock operation of the sill knob lever is not transmitted to the lock lever, an actuator for anti-theft operation for changing the anti-theft member between the anti-theft position and the anti-theft cancelled position;

wherein said latch mechanism and said relay mechanism are formed separately and each is mounted to the vehicle door spaced apart from each other in different housings;

wherein said latch mechanism is mounted to a rear end portion of the door and said relay mechanism is mounted at approximately a middle portion between a front and a rear of the vehicle door.

13. The relay mechanism engaged to the latch mechanism on a vehicle door of a vehicle body according to claim 12, wherein said anti-theft member is engaged with the sub locking lever when at the anti-theft position, wherein said relay mechanism has a cancelling cam face which is engageable by the anti-theft member and causes the anti-theft member to return to the anti-theft cancelled position by coming into slidable contact with the anti-theft member when the sub locking lever is turned by an unlocking operation of the key cylinder under the anti-theft position.

14. The relay mechanism engaged to the latch mechanism on a vehicle door of a vehicle body according to claim 12, wherein said relay mechanism is mounted in a space between a dressing panel of the vehicle door and a metallic inner panel to which the dressing panel is installed.

15. A relay mechanism engaged to a latch mechanism on a vehicle door of a vehicle body according to claim 12, wherein said sub locking lever and said sill knob lever are rotatably supported by the same shaft.

16. The relay mechanism engaged to the latch mechanism on a vehicle door of a vehicle body according to claim 15, wherein said sub locking lever has a first elongated hole extending radially from said shaft, wherein said sill knob lever has an engaging hole consisting of a second elongated hole corresponding to the first elongated hole and an escape hole communicating with the second elongated hole, wherein said anti-theft member has a pin portion slidably engaged with both of the first elongated hole and the engaging hole.

17. The relay mechanism engaged to the latch mechanism on a vehicle door of a vehicle body according to claim 12, wherein said sill knob lever has a guide surface which comes into contact with the anti-theft member to return the sill knob lever to the locked position from the unlocked position when the anti-theft member moves from the anti-theft position to the anti-theft cancelled position.

18. The relay mechanism engaged to the latch mechanism on a vehicle door of a vehicle body according to claim 16, wherein said relay mechanism has an aperture which is formed in a stationary member thereof, said aperture having a cancelling cam face which causes the anti-theft member to return to the anti-theft cancelled position by coming into contact with the pin portion when the lock lever is turned by an unlocking operation of the key cylinder under the anti-theft position.

19. The relay mechanism engaged to the latch mechanism on a vehicle door of a vehicle body according to claim 12, said sill knob lever having a guide surface which is engageable by the anti-theft member and moves the sill knob lever to return to the locked position from the unlocked position by abutting and slidably engaging with the anti-theft member when the anti-theft member is displaced from the anti-theft position to the anti-theft cancelled position.

20. The relay mechanism engaged to the latch mechanism on a vehicle door of a vehicle body according to claim 12, wherein a longitudinal plane of said sill knob lever is parallel to a longitudinal plane of the anti-theft member.

21. A relay mechanism engaged to a latch mechanism on a vehicle door of a vehicle body, comprising:

a latch mechanism having a latch engaging with a striker of the vehicle body, an opening means for releasing the engagement of the latch and the striker, and a lock lever connected to a key cylinder of the vehicle door and changed between a locked position precluding operation of the opening means and an unlocked position permitting operation of the opening means; and a relay mechanism having a sill knob lever connected to a sill knob of the vehicle door, an anti-theft member provided between the lock lever and the sill knob lever and arranged to be changed between an anti-theft cancelled position in which the anti-theft member interconnects with the lock lever and the sill knob lever and an anti-theft position in which the anti-theft member disconnects the lock lever and the sill knob lever, wherein an unlock operation of the sill knob lever is not transmitted to the lock lever, an actuator for anti-theft operation for changing the anti-theft member between the anti-theft position and the anti-theft cancelled position;

said sill knob lever having a guide surface which is engageable by the anti-theft member and moves the sill knob lever to return to the locked position from the unlocked position by abutting and slidably engaging with the anti-theft member when the anti-theft member is displaced from the anti-theft position to the anti-theft cancelled position;

said relay mechanism is mounted at about middle position between front and rear of the vehicle door.

22. The relay mechanism engaged to the latch mechanism on a vehicle door of a vehicle body according to claim 21, wherein said relay mechanism is mounted in a space between a metallic inner panel of the vehicle door and a dressing panel which is installed to the inner panel so that said relay mechanism is located at about middle position between front and rear of the vehicle door.

23. A relay mechanism engaged to a latch mechanism on a vehicle door of a vehicle body according to claim 21, wherein said sublocking lever and said sill knob lever are rotatably supported by the same shaft.

24. A relay mechanism engaged to latch mechanism on a vehicle door of a vehicle body according to claim 21, wherein said sublocking lever has a first elongated hole extending radially from said shaft, wherein said sill knob lever has an engaging hole consisting of a second elongated hole corresponding to the first-elongated hole and a escape hole communicating with the second elongated hole, wherein said anti-theft member has a pin portion slidably engaged with both of the first elongated hole and the engaging hole.

25. A relay mechanism engaged to a latch mechanism on a vehicle door of a vehicle body according to claim 21, wherein a guide surface which comes into contact with the pin portion to return the sill knob lever to the locked position when the pin portion moves from the anti-theft position to the anti-theft cancelled position is formed in the engaging hole.

26. A relay mechanism engaged to a latch mechanism on a vehicle door of a vehicle body according to claim 21, wherein said relay mechanism has an aperture which is formed in a stationary member thereof, said aperture having a cancelling cam face which causes the anti-theft member to return to the anti-theft cancelled position by coming into contact with the pin portion when the lock lever is turned by an unlocking operation of the key cylinder under the anti-theft position.

27. A relay mechanism engaged to a latch mechanism on a vehicle door of a vehicle body, comprising:

a latch mechanism having a latch engaging with a striker of the vehicle body, an opening means for releasing the engagement of the latch and the striker, and a lock lever connected to a key cylinder of the vehicle door and changed between a locked position precluding operation of the opening means and an unlocked position permitting operation of the operating means; and a relay mechanism having a sill knob lever connected to a sill knob of the vehicle door, a sub locking lever connected to the lock lever through a wire or a rod, an anti-theft member provided between the sub locking lever and the sill knob lever and arranged to be changed between an anti-theft cancelled position in which the anti-theft member engages with the sub locking lever and the sill knob lever, wherein an anti-theft position in which the anti-theft member engages with the sub locking lever and the sill knob lever and an unlock operation of the sill knob lever is not transmitted to the lock lever, an actuator for anti-theft operation for changing the anti-theft member between the anti-theft position and the anti-theft cancelled position;

wherein said latch mechanism and said relay mechanism are formed separately and mounted to the vehicle door independently spaced apart from each other;

said sill knob lever having a guide surface which is engageable by the anti-theft member and moves the sill knob lever to return to the locked position from the unlocked position by abutting and slidably engaging with the anti-theft member when the anti-theft member is displaced from the anti-theft position to the anti-theft cancelled position;

wherein said latch mechanism is mounted to a rear end portion of the vehicle door, and said relay mechanism is mounted within a space between a dressing panel of the vehicle door and a metallic inner panel to which the dressing panel is installed, so that the relay mechanism is located substantially at a middle position between front and rear of the vehicle door.

28. A relay mechanism engaged to a latch mechanism on a vehicle door of a vehicle body according to claim 27, wherein said sub locking lever and said sill knob lever are rotatably supported by the same shaft.

29. A relay mechanism engaged to a latch mechanism on a vehicle door of a vehicle body according to claim 27, wherein said sub locking lever has a first elongated hole extending radially from said shaft, wherein said sill knob lever has an engaging hole consisting of a second elongated hole corresponding to the first elongated hole and a escape hole communicating with the second elongated hole, wherein said anti-theft member has a pin portion engaged with both of the first elongated hole and the engaging hole.

30. The relay mechanism engaged to the latch mechanism on a vehicle door of a vehicle body according to claim 29, wherein a guide surface which comes into contact with the pin portion to return the sill knob lever to the locked position when the pin portion moves from the anti-theft position to the anti-theft cancelled position is formed in the engaging hole.

31. The relay mechanism engaged to the latch mechanism on a vehicle door of a vehicle body according to claim 29, wherein said relay mechanism has an aperture which is formed in a stationary member thereof, said aperture having a cancelling cam face which causes the anti-theft member to return to the anti-theft cancelled position by coming into contact with the pin portion when the lock lever is turned by an unlocking operation of the key cylinder under the anti-theft position.

32. A relay mechanism engaged to a latch mechanism on a vehicle door of a vehicle body, comprising:

a latch mechanism having a latch engaging with a striker of the vehicle body, an opening means for releasing the engagement of the latch and the striker, and a lock lever connected to a key cylinder of the vehicle door and changed between a locked position precluding operation of the opening means and an unlocked position permitting operation of the opening means; and a relay mechanism having a sill knob lever connected to a sill knob of the vehicle door and changeable between a locked position and an unlocked position, a sub locking lever connected to the lock lever through a wire or a rod, an anti-theft member provided between the sub locking lever and the sill knob lever and arranged to be changeable between an anti-theft cancelled position in which the anti-theft member interconnects the sub locking lever and the sill knob lever and an anti-theft position in which the anti-theft member disconnects the sub locking lever and the sill knob lever, wherein an unlock operation of the sill knob lever is not transmitted to the lock lever, an actuator for anti-theft operation for changing the anti-theft member between the anti-theft position and the anti-theft cancelled position;

wherein said latch mechanism and said relay mechanism are formed separately and each is mounted to the vehicle door independently spaced apart from each other in different housings;

wherein said sub locking lever and said sill knob lever are rotatably supported by the same shaft.

33. The relay mechanism engaged to the latch mechanism on a vehicle door of a vehicle body according to claim 32, wherein a longitudinal plane of said sill knob lever is parallel to a longitudinal plane of the anti-theft member.

* * * * *